United States Patent
Bahadirov

(10) Patent No.: US 9,674,686 B2
(45) Date of Patent: Jun. 6, 2017

(54) APPARATUS AND METHOD FOR PAIRING MOBILE DEVICES

(71) Applicant: Samsung Electronics Co. Ltd., Suwon-si, Gyeonggi-do (KR)

(72) Inventor: Izzatulla Bahadirov, Kendall Park, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/736,352

(22) Filed: Jan. 8, 2013

(65) Prior Publication Data

US 2014/0194063 A1    Jul. 10, 2014

(51) Int. Cl.
| H04B 7/00 | (2006.01) |
| H04W 8/00 | (2009.01) |
| H04L 29/06 | (2006.01) |
| H04W 4/00 | (2009.01) |
| H04W 4/08 | (2009.01) |
| H04W 12/06 | (2009.01) |

(52) U.S. Cl.
CPC ......... *H04W 8/005* (2013.01); *H04L 63/0492* (2013.01); *H04W 4/008* (2013.01); *H04W 4/08* (2013.01); *H04W 12/06* (2013.01)

(58) Field of Classification Search
CPC ............................ H04W 56/0055; H04W 12/06
See application file for complete search history.

(56) References Cited

U.S. PATENT DOCUMENTS

| 8,656,067 B2 * | 2/2014 | Hanes ................... G06F 3/0231 710/15 |
| 2009/0156123 A1 * | 6/2009 | Kim ..................... H04M 1/7253 455/41.2 |
| 2009/0163141 A1 * | 6/2009 | Chae ................... H04M 1/7253 455/41.3 |
| 2010/0082990 A1 * | 4/2010 | Grigorovitch ........ H04W 12/06 713/176 |
| 2011/0207408 A1 * | 8/2011 | Lefebvre ............... H04L 67/104 455/41.2 |
| 2012/0284413 A1 * | 11/2012 | Miura ................... G06F 21/445 709/227 |
| 2013/0169550 A1 * | 7/2013 | Gai ......................... G06F 3/041 345/173 |
| 2013/0169571 A1 * | 7/2013 | Gai ..................... G06F 3/03547 345/173 |
| 2013/0269550 A1 * | 10/2013 | Wilen ..................... G06Q 20/28 101/18 |

* cited by examiner

*Primary Examiner* — Mohammed Rachedine
(74) *Attorney, Agent, or Firm* — Jefferson IP Law, LLP

(57) ABSTRACT

An apparatus and method for pairing mobile terminals are provided. The method includes detecting, by a first mobile terminal, a touch input corresponding to a request to pair a first mobile terminal with at least one other mobile terminal, broadcasting, by the first mobile terminal, pairing information, and connecting the first mobile terminal with the at least one other mobile terminal.

26 Claims, 3 Drawing Sheets

APPARATUS AND METHOD FOR PAIRING MOBILE DEVICES

BACKGROUND OF THE INVENTION

1. Field of the Invention

The present invention relates to an apparatus and method for pairing mobile devices. More particularly, the present invention relates to an apparatus and method for pairing and/or grouping mobile devices by detecting a touch input to a touchscreen and distinguishing between different types of touch inputs.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life. Further, as mobile terminals become more and more engrained everyday lives, the mobile terminals are being used for more interactive purposes, such as a mobile terminal interacting with another mobile terminal.

Recently, mobile terminals have been configured to transfer files or data to other mobile terminals. For example, mobile terminals have been configured to transfer files to another mobile terminal via Bluetooth pairing or Android Beam.

A terminal according to the related art includes various means for pairing with other devices. For example, a terminal according to the related art generally includes a menu through which a user may configure the terminal to pair with other devices. Such a terminal includes a feature for configuring the terminal to pair with other devices and for initiating the pairing. Such a feature is generally nested within a menu along with other terminal options or applications. Therefore to initiate pairing of a terminal with other terminals, a user must navigate through the menu to select the appropriate feature.

Therefore, there is a need for a more simplistic and more efficient method for pairing devices. Accordingly, there is a need for an apparatus and method for pairing and/or grouping mobile devices by detecting a touch input to a touchscreen and distinguishing between different types of touch inputs.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for pairing and/or grouping mobile devices by detecting a touch input to a touchscreen and distinguishing between different types of touch inputs.

In accordance with an aspect of the present invention, a method for pairing with at least one mobile terminal is provided. The method includes detecting, by a first mobile terminal, a touch input corresponding to a request to pair a first mobile terminal with at least one other mobile terminal, broadcasting, by the first mobile terminal, pairing information, and connecting the first mobile terminal with the at least one other mobile terminal.

In accordance with another aspect of the present invention, an apparatus for pairing with at least one mobile terminal is provided. The apparatus includes an input unit configured to receive a touch input, at least one controller configured to determine whether the touch input corresponds to a request to pair the apparatus with the at least one mobile terminal, to generate pairing information based on characteristics of at least one of the touch input and the apparatus, and to connect the apparatus with the at least one mobile terminal, and a communication unit configured to broadcast the pairing information.

In accordance with another aspect of the present invention, an apparatus for pairing with at least one mobile terminal is provided. The apparatus includes a communication unit configured to receive pairing information from at least one mobile terminal, and at least one controller configured to operatively connect the apparatus with the at least one mobile terminal.

In accordance with another aspect of the present invention, a computer readable storage medium is provided. The apparatus includes detecting a touch input corresponding to a request to pair a first mobile terminal with at least one other mobile terminal, broadcasting pairing information, and connecting the first mobile terminal with the at least one other mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
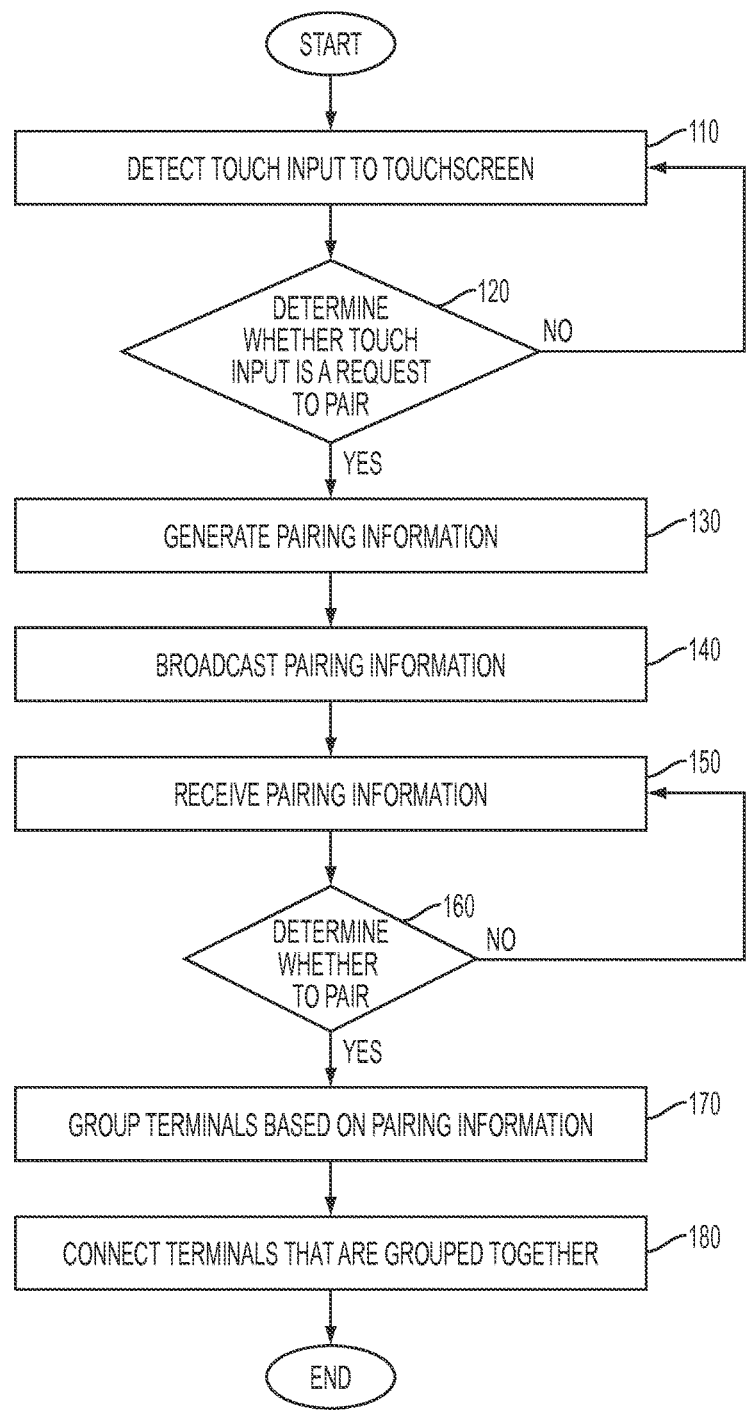
FIG. 1 is a flowchart illustrating a method for pairing mobile terminals according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for pairing and/or grouping mobile devices by detecting a touch input to a touchscreen and distinguishing between different types of touch inputs.

According to exemplary embodiments of the present invention, a plurality of mobile terminals connected to a common network or communicating using a common communication means may communicate with one another so as to become aware of each other's presence.

According to exemplary embodiments of the present invention, a plurality of mobile terminals may be paired to distribute data among the mobile terminals. For example, in a corporate setting, it may be desirable for all attendees to a meeting to have presentation or meeting materials. Therefore, each of the attendees may have a mobile terminal that may be paired such that the presentation or meeting materials can be distributed among the paired mobile terminals. As another example, a plurality of mobile devices may be interconnected to share game data (e.g., data generated in real-time collective gaming). As another example, a plurality of mobile devices may be interconnected to share contact information.

According to exemplary embodiments of the present invention, a plurality of mobile devices may be paired such that the paired devices may share or exchange contact information among the plurality of mobile devices. For example, if an owner of a mobile device wants to share or exchange contact information with at least one other owner of a mobile device, the mobile device and the at least one other mobile device may be paired or interconnected to facilitate the sharing or exchange of contact information. As a further example, the mobile device and/or the at least one other mobile device may broadcast the contact information of the mobile device's corresponding owner. The at least one other mobile device may receive the broadcasted contact information. According to exemplary embodiments of the present invention, the at least one other mobile device may add the received contact information to its corresponding contact list or may otherwise store the received contact information.

According to exemplary embodiments of the present invention, an application may be loaded on each of the plurality of mobile terminals such that the plurality of mobile terminals exchange contact information so as to form or create a distribution group. For example, meeting attendees may wish to form a distribution group for distribution of documents, meeting minutes, and/or other information relating to the distribution group or the meeting. Each of the mobile terminals may store the distribution group. As an example, the distribution group may be edited to add individuals or addresses for contacts that were not present during the meeting or pairing. As another example, the distribution group may be edited to delete individuals or addresses for contacts at the meeting that do not require communications relating to the meeting or the group.

According to exemplary embodiments of the present invention, an application (e.g., a game, corporate application, and the like) may be loaded on each of the plurality of mobile terminals. Each of the plurality of mobile terminals may "listen" to swipe gestures corresponding to touch inputs to the corresponding mobile terminal's touch screen. For example, a mobile terminal may detect when a touch input corresponding to a request or instruction to pair or group the mobile terminal with at least one other mobile terminal is entered to a touchscreen. Upon detection of such a touch input, the corresponding mobile terminal may initiate pairing or grouping with at least one other mobile terminal.

According to exemplary embodiments of the present invention, a mobile terminal may initiate the pairing or grouping process directly through an application (e.g., a game, corporate application, and the like) so as to not require a user to navigate a menu stored in the mobile terminal (e.g., such that the user does not have to navigate through the mobile terminal settings to configure and initiate the pairing process).

According to exemplary embodiments of the present invention, a mobile terminal may "listen" for a touch input corresponding to a request to initiate pairing upon loading of an application (e.g., a game, corporate application, and the like). The application may be an application for which pairing is an ancillary feature.

According to exemplary embodiments of the present invention, a mobile terminal may detect a touch input corresponding to a request or instruction to pair or group the mobile terminal with at least one other mobile terminal. When the touch input is detected, the mobile terminal may broadcast an indication that the mobile terminal requests pairing or grouping with at least one other mobile terminal. According to exemplary embodiments of the present invention, the broadcasted indication may include a timestamp information associated with the detected touch input. For example, the timestamp information may include an indication as to when the touch input was initiated. As another example, the timestamp information may include an indication as to when the touch input was completed. As a further example, the timestamp information may include both an indication as to when the touch input was initiated and an indication as to when the touch input was completed.

According to exemplary embodiments of the present invention, the mobile terminal may broadcast co-ordinates of the touch input to the touchscreen. For example, the mobile terminal may broadcast the x-y coordinates of the touch input relative to the touchscreen so as to communicate information regarding the input swipe.

According to exemplary embodiments of the present invention, the mobile terminal may extract information relating to the physical orientation of the paired or grouped mobile terminals. For example, the mobile terminal may extract such information from the broadcasted information (e.g., pairing information) regarding the swipe or the touch input. The extracted information may be used in the application (e.g., a game, corporate application, and the like) being used in conjunction with the pairing or grouping. For example, the extracted information relating to the physical orientation may indicate that a right side of mobile terminal 1 is adjacent to a top side of mobile terminal 2.

According to exemplary embodiments of the present invention, the touch input may be a finger swipe across the touchscreen of the mobile terminal. According to exemplary embodiments of the present invention, a user of the mobile terminal may configure the mobile terminal so as to define the specific finger swipe that corresponds to a request or instruction to pair or group the mobile terminal with at least one other mobile terminal. For example, the user may define the specific finger swipe within the application (e.g., a game, corporate application, and the like) within which the user wishes to pair the mobile terminal. As another example, the user may define the specific finger swipe globally within the mobile terminal such that the specific finger swipe is recognized within all applications (e.g., a game, corporate application, and the like) within which the user may request a pairing or grouping.

According to exemplary embodiments of the present invention, the mobile terminal may configured to "listen" or poll for broadcasts from other devices corresponding to a request or an indication that the broadcasting mobile terminal is attempting to pair or group with another mobile terminal. For example, the mobile terminal may "listen" for or poll for a broadcasted indication that the broadcasting mobile terminal requests pairing or grouping with another mobile terminal. The mobile terminal may determine the number of mobile devices attempting to pair or group with another mobile terminal. The mobile terminal may use the broadcasted indication to distinguish among the various broadcasting mobile terminals. For example, the mobile terminals attempting to pair or group may have a unique identifier associated therewith or may be assigned a unique number or identification based on their corresponding swipe sequence (e.g., based on at least one of an indication as to when the touch input was initiated and an indication as to when the touch input was completed). The unique identifiers may be broadcasted to facilitate the pairing or grouping of the mobile terminals into a group.

FIG. 1 is a flowchart illustrating a method for pairing mobile terminals according to an exemplary embodiment of the present invention.

Referring to FIG. 1, a mobile terminal (e.g., a first mobile terminal) detects a touch input at step 110. For example, the mobile terminal may detect a touch input to a touchscreen. The mobile terminal may detect characteristics of the touch input, including a time that the touch input was initiated, a time that the touch input was completed, a location at which the touch was initiated, a location at which the touch input was completed, and a series of locations covered by the touch. According to exemplary embodiments of the present invention, the touch input may be detected or the mobile terminal may poll for a touch input when the mobile terminal is running an application (e.g., a game, corporate application, and the like) within which the user may request a pairing or grouping with at least one other mobile terminal.

When a touch input is detected at step 110, the process for paring mobile terminals proceeds to step 120 at which the mobile terminal determines whether the touch input corresponds to a request to pair the mobile terminal with at least one other mobile terminal. As an example, the mobile terminal may determine whether the touch input corresponds to a predefined (e.g., user defined) input. According to exemplary embodiments of the present invention, the touch input may be a specific or defined swipe on a touchscreen of the mobile terminal. If the mobile terminal determines that the touch input does not correspond to a request to pair the mobile terminal with at least one other mobile terminal, then the process for paring mobile terminals returns to step 110. In contrast, if the mobile terminal determines that the touch input corresponds to a request to pair the mobile terminal with at least one other mobile terminal, then the process for paring mobile terminals proceeds to step 130.

At step 130, the mobile terminal generates pairing information. According to exemplary embodiments of the present invention, pairing information may include a time that the touch input was initiated, a time that the touch input was completed, a location at which the touch was initiated, a location at which the touch input was completed, a series of locations covered by the touch, and a unique identifier corresponding to the mobile terminal.

At step 140, the mobile terminal broadcasts an indication that the mobile terminal wants to pair with at least one other mobile terminal. For example, the mobile terminal may broadcast the pairing information.

At step 150, at least one other mobile terminal receives the broadcasted indication that the mobile terminal (e.g., the first mobile terminal) wants to pair with at least one other mobile terminal. For example, the at least one other mobile terminal may receive the pairing information of the first mobile terminal.

At step 160, at least one other mobile terminal determines whether to pair with the first terminal. The at least one mobile terminal may determine whether to pair with the first terminal based on the received pairing information. According to exemplary embodiments of the present invention, the at least one mobile terminal may determine whether to pair with the first terminal based on user input to the at least one mobile terminal. For example, the user input may be input in an application in which the user may pair with at least one other mobile terminal to facilitate functions of the application. If the at least one other mobile terminal determines not to pair with the first terminal, then the process for paring mobile terminals returns to step 150. In contrast, if the at least one other mobile terminal determines to pair with the first terminal, then the process for paring mobile terminals proceeds to step 170.

At step 170, the at least one other mobile terminal groups the mobile terminals. As an example, at least one of the other mobile terminals may define a group of terminals based on pairing information. As another example, at least one of the other terminals may define a group of terminals based on user selection in an application within which mobile terminals may be paired. According to an exemplary embodiment of the present invention, the at least one other mobile terminal may extract information from the received pairing information. Based on the pairing information, the at least one other mobile terminal may determine a physical orientation of the mobile terminals. For example, the at least one other mobile terminal may determine the relative physical orientations and positions of the mobile terminals. This information may be used in the application within which the mobile terminals are paired or grouped.

At step 180, the mobile terminal connects with the at least one other mobile terminal. According to exemplary embodiments of the present invention, the mobile terminal may connect with those terminals with which the mobile terminal is grouped. The mobile terminal may connect with those terminals with which it is grouped within an application within which pairing among mobile terminals may facilitate further functions of the application.

Figure 2:
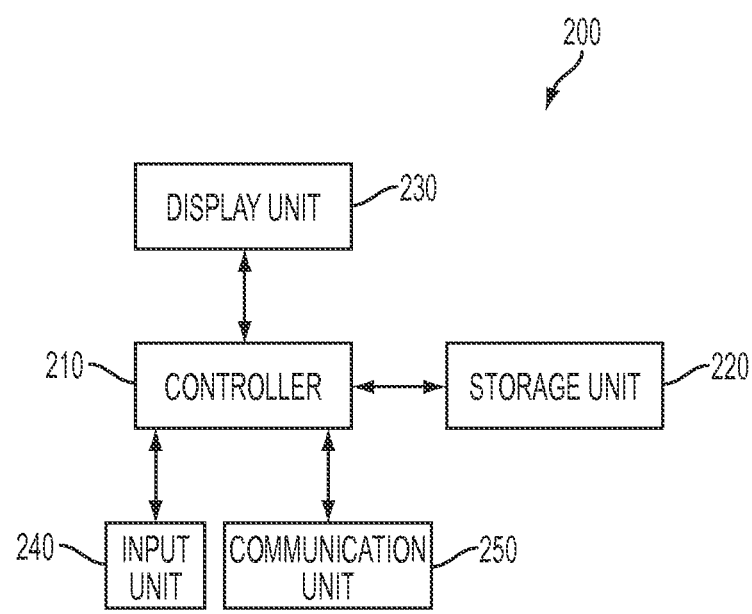
FIG. 2 is block diagram schematically illustrating a configuration of a mobile terminal according to an exemplary embodiment of the present invention.

FIG. 2 is block diagram schematically illustrating a configuration of a mobile terminal according to an exemplary embodiment of the present invention.

Referring to FIG. 2, the mobile terminal 200 includes a controller 210, a storage unit 220, a display unit 230, an input unit 240, and a communication unit 250.

According to exemplary embodiments of the present invention, the mobile terminal 200 may be configured to pair with at least one other mobile terminal. The mobile terminal 200 may be paired with at least one other mobile terminal within an application (e.g., within which pairing with a mobile terminal facilitates further functions). The mobile terminal 200 may be configured to detect an input and to determine whether the input corresponds to a defined input corresponding to a request to pair with at least one other mobile terminal. The mobile terminal 200 may be assigned an identifier from at least one other mobile terminal to facilitate identification among paired mobile terminals.

The storage unit 220 can store user data, and the like, as well a program which performs operating functions according to an exemplary embodiment of the present invention. For example, the storage unit 220 may store a program for controlling general operation of a mobile terminal 200, an Operating System (OS) which boots the mobile terminal 200, and application program for performing other optional functions such as a camera function, a sound replay function, an image or video replay function, a Near Field Communication (NFC) function, a pairing function, and the like. Further, the storage unit 220 may store user data generated according to a user of the mobile terminal, such as, for example, a text message, a game file, a music file, a movie file, and the like. In particular, the storage unit 220 according to exemplary embodiments of the present invention may store a table which stores a mapping of inputs to defined functions such as a mapping of a touch input to a request to pair with at least one other mobile terminal. The storage unit 220 may store characteristics of detected touch inputs. For example, the storage unit 220 may store a time that the touch input was initiated, a time that the touch input was completed, a location at which the touch was initiated, a location at which the touch input was completed, and a series of locations covered by the touch input. The storage unit 220 may store pairing information which may include an identification of the mobile terminal and/or characteristics of a touch input corresponding to a request to pair the mobile terminal with at least one other mobile terminal.

The communication unit 250 may be configured for communicating with other devices. For example, the communication unit 250 may be configured to communicate via Bluetooth technology, WiFi technology, or another wireless technology. According to exemplary embodiments of the present invention, after the mobile terminal 200 is paired, the mobile terminal 200 may transfer data to another mobile terminal via the communication unit 250.

The input unit 240 may include input keys and function keys for receiving user input. For example, the input unit 240 may include input keys and function keys for receiving an input of numbers or various sets of letter information, setting various functions, and controlling functions of the mobile terminal 200. For example, the input unit 240 may include a calling key for requesting a voice call, a video call request key for requesting a video call, a termination key for requesting termination of a voice call or a video call, a volume key for adjusting output volume of an audio signal, a direction key, and the like. In particular, the input unit 240 according to exemplary embodiments of the present invention may transmit to the controller 210 signals related to a touch input or a swipe. For example, the touch input 240 may transmit signals corresponding to the characteristics to a touch input or a swipe, based on which the controller 210 may determine whether a request to pair is input. Such an input unit 240 may be formed by one or a combination of input means such as a touch pad, a touchscreen, a button-type key pad, a joystick, a wheel key, and the like.

The display unit 230 displays information inputted by user or information to be provided to user as well as various menus of the mobile terminal 200. For example, the display unit 230 may provide various screens according to a user of the mobile terminal 200, such as an idle screen, a message writing screen, a calling screen, and the like. In particular, the display unit 230 according to exemplary embodiments of the present invention can display a graphical user interface associated with an application within which the user may input a touch input or swipe for requesting a pairing with at least one other mobile terminal. Further, the display unit 230 may display a menu within and application. The menu may include a list of functions relating to the transfer of data across devices. For example, the display unit 530 may display an interface which the user may manipulate or otherwise enter inputs via a touch screen to enter selection of the data that may be transferred or selection of devices to which the data may be transferred. The display unit 230 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples. Further, the display unit 230 can perform the function of the input unit 240 if the display unit 230 is formed as a touch screen.

According to exemplary embodiments of the present invention, the mobile terminal comprises at least one controller 210. The at least one controller 210 may be configured to operatively control the mobile terminal 200. For example, the controller 210 may control operation of the various components or units included in the mobile terminal 200. The controller 210 may transmit a signal to the various components included in the mobile terminal 200 and control a signal flow between internal blocks of the mobile terminal 200. In particular, the controller 210 according to exemplary embodiments of the present invention can control determining whether a touch input corresponds to a request to pair the mobile terminal 200 with at least one other mobile terminal, to generate pairing information based on characteristics of at least one of the touch input and the mobile terminal 200, to broadcast an indication that the mobile terminal 200 wants to pair with at least one other mobile terminal, and to operatively connect the mobile terminal 200 with at least one other mobile terminal.

Figure 3:
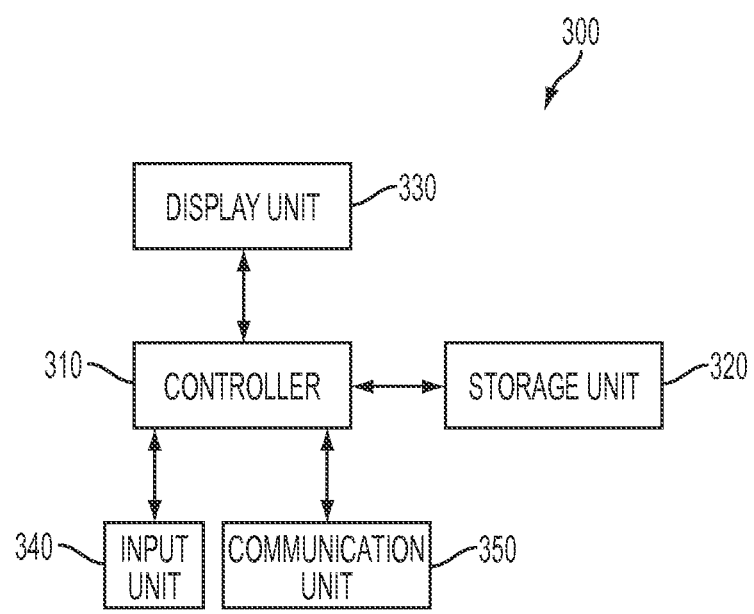
FIG. 3 is block diagram schematically illustrating a configuration of a mobile terminal according to an exemplary embodiment of the present invention.

FIG. 3 is block diagram schematically illustrating a configuration of a mobile terminal according to an exemplary embodiment of the present invention.

Referring to FIG. 3, the mobile terminal 300 includes a controller 310, a storage unit 320, a display unit 330, an input unit 340, and a communication unit 350.

According to exemplary embodiments of the present invention, the mobile terminal 300 may be configured to pair with at least one other mobile terminal. The mobile terminal 300 may be paired with at least one other mobile terminal within an application (e.g., within which pairing with a mobile terminal facilitates further functions). The mobile terminal 300 may be configured to receive an indication that at least one other mobile terminal wants to initiate pairing with at least one mobile terminal. The mobile terminal 300 may determine whether to pair the mobile terminal that broadcasted the indication for pairing with at least one mobile terminal, and may determine a grouping of mobile terminals to pair with one another. According to exemplary embodiments of the present invention, the group of mobile terminals to pair may be based on the characteristics of the mobile terminals, on the pairing information, and on user selection to the mobile terminal 300.

The storage unit 320 can store user data, and the like, as well a program which performs operating functions according to an exemplary embodiment of the present invention. For example, the storage unit 320 may store a program for controlling general operation of a mobile terminal 300, an Operating System (OS) which boots the mobile terminal 300, and application program for performing other optional functions such as a camera function, a sound replay function, an image or video replay function, a Near Field Communication (NFC) function, a pairing function, and the like. Further, the storage unit 320 may store user data generated according to a user of the mobile terminal, such as, for example, a text message, a game file, a music file, a movie file, and the like. In particular, the storage unit 320 according to exemplary embodiments of the present invention may store a table which stores a mapping of inputs to defined functions such as a mapping of a touch input to a request to pair with at least one other mobile terminal. The storage unit 320 may store received information including characteristics of detected touch inputs. For example, the storage unit 320 may store a time that the touch input was initiated, a time that the touch input was completed, a location at which the touch was initiated, a location at which the touch input was completed, and a series of locations covered by the touch input. The storage unit 320 may store pairing information which may include an identification of the mobile terminal and/or characteristics of a touch input corresponding to a request to pair the mobile terminal with at least one other mobile terminal.

The communication unit 350 may be configured for communicating with other devices. For example, the communication unit 350 may be configured to communicate via Bluetooth technology, WiFi technology, or another wireless technology. According to exemplary embodiments of the present invention, after the mobile terminal 300 is paired, the mobile terminal 300 may transfer data to another mobile terminal via the communication unit 350.

The input unit 340 may include input keys and function keys for receiving user input. For example, the input unit 340 may include input keys and function keys for receiving an input of numbers or various sets of letter information, setting various functions, and controlling functions of the mobile terminal 300. For example, the input unit 340 may include a calling key for requesting a voice call, a video call request key for requesting a video call, a termination key for requesting termination of a voice call or a video call, a volume key for adjusting output volume of an audio signal, a direction key, and the like. In particular, the input unit 340 according to exemplary embodiments of the present invention may transmit to the controller 310 signals related to a touch input or a swipe. For example, the touch input 340 may transmit signals corresponding to the characteristics to a touch input or a swipe, based on which the controller 310 may determine whether to pair mobile terminals, or to determine a grouping of mobile terminals. Such an input unit 340 may be formed by one or a combination of input means such as a touch pad, a touchscreen, a button-type key pad, a joystick, a wheel key, and the like.

The display unit 330 displays information inputted by user or information to be provided to user as well as various menus of the mobile terminal 300. For example, the display unit 330 may provide various screens according to a user of the mobile terminal 300, such as an idle screen, a message writing screen, a calling screen, and the like. In particular, the display unit 330 according to exemplary embodiments of the present invention can display a graphical user interface associated with an application within which the user may input a touch input or swipe for confirming a pairing with at least one other mobile terminal, or for defining a group of paired mobile terminals. Further, the display unit 330 may display a menu within and application. The menu may include a list of functions relating to the transfer of data across devices. For example, the display unit 330 may display an interface which the user may manipulate or otherwise enter inputs via a touch screen to enter selection of the data that may be transferred or selection of devices to which the data may be transferred. The display unit 330 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples. Further, the display unit 330 can perform the function of the input unit 340 if the display unit 330 is formed as a touch screen.

According to exemplary embodiments of the present invention, the mobile terminal comprises at least one controller 310. The at least one controller 310 may be configured to operatively control the mobile terminal 300. For example, the controller 310 may control operation of the various components or units included in the mobile terminal 300. The controller 310 may transmit a signal to the various components included in the mobile terminal 300 and control a signal flow between internal blocks of the mobile terminal 300. In particular, the controller 310 according to exemplary embodiments of the present invention can control determining whether a received information (e.g., including pairing information) corresponds to a request to pair the mobile terminal with at least one other mobile terminal, to extract pairing information, to receive an indication that the mobile terminal wants to pair with at least one other mobile terminal, and to operatively connect the mobile terminal with at least one other mobile terminal.

As a non-exhaustive illustration only, a terminal described herein may refer to mobile devices such as a cellular phone, a Personal Digital Assistant (PDA), a digital camera, a portable game console, and an MP3 player, a Portable/Personal Multimedia Player (PMP), a handheld e-book, a portable lap-top Personal Computer (PC), a tablet PC, a Global Positioning System (GPS) navigation, and devices such as a desktop PC, a High Definition Television (HDTV), an optical disc player, a setup box, and the like capable of wireless communication or network communication consistent with that disclosed herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for pairing mobile terminals, the method comprising:
   detecting, by a first mobile terminal, a touch input corresponding to a request to pair a first mobile terminal with at least one other mobile terminal;
   broadcasting, by the first mobile terminal, pairing information, the pairing information including a characteristic of the touch input; and
   connecting the first mobile terminal with the at least one other mobile terminal based, at least in part, on the characteristic of the touch input,
   wherein the characteristic of the touch input comprises at least two of:
     a location of the first mobile terminal,
     a position of at which the touch input was initiated,
     a position of at which the touch input was completed,
     a time at which the touch input was initiated,
     a time at which the touch input was completed, or
     a series of locations covered by the touch, and
   wherein the connecting of the first mobile terminal with the at least one other mobile terminal comprises grouping the first mobile terminal with the at least one other mobile terminal within an application being executed on the first mobile terminal.

2. The method of claim 1, wherein the grouping of the first mobile terminal with the at the at least one other mobile terminal comprises:
   defining a paired group based on the pairing information.

3. The method of claim 2, wherein the grouping of the first mobile terminal with the at the at least one other mobile terminal comprises:
   determining of a physical orientation of the first mobile terminal and the at least one other terminal in the paired group relative to each other based on the pairing information.

4. The method of claim 1, wherein the detecting of the touch input corresponding to the request to pair the first mobile with at least one other mobile terminal comprises:
   detecting a position of at which the touch input was initiated.

5. The method of claim 1, wherein the detecting of the touch input corresponding to the request to pair the first mobile with at least one other mobile terminal comprises:
   detecting a position of at which the touch input was completed.

6. The method of claim 1, wherein the detecting of the touch input corresponding to the request to pair the first mobile with at least one other mobile terminal comprises:
   detecting a time at which the touch input was initiated.

7. The method of claim 1, wherein the detecting of the touch input corresponding to the request to pair the first mobile with at least one other mobile terminal comprises:
   detecting a time at which the touch input was completed.

8. The method of claim 1, further comprising:
   extracting, by at least one of the at least one other mobile terminal, information regarding the touch input from the pairing information.

9. The method of claim 1, further comprising:
   defining the touch input that corresponds to the request to pair the first mobile terminal with the at least one other mobile terminal.

10. The method of claim 1, wherein the touch input corresponds to a defined swipe on a touchscreen of the first mobile terminal.

11. The method of claim 1, wherein the connecting of the first mobile terminal with the at least one other mobile terminal comprises operatively connecting the first mobile terminal through an application being executed by the first mobile terminal and the at least one other mobile terminal.

12. An apparatus for pairing with at least one mobile terminal, the apparatus comprising:
    an input unit configured to receive a touch input;
    at least one processor configured to:
      determine whether the touch input corresponds to a request to pair the apparatus with the at least one mobile terminal,
      generate pairing information based on characteristics of at least one of the touch input and the apparatus, wherein the pairing information includes a characteristic of the touch input, and
      connect the apparatus with the at least one mobile terminal, based, at least in part, on the characteristic of the touch input; and
    a transceiver configured to broadcast the pairing information,
    wherein the characteristic of the touch input comprises at least two of:
      a location of the first mobile terminal,
      a position of at which the touch input was initiated,
      a position of at which the touch input was completed,
      a time at which the touch input was initiated,
      a time at which the touch input was completed, or
      a series of locations covered by the touch, and
    wherein the apparatus and the at least one mobile terminal are grouped within an application being executed on the apparatus.

13. The apparatus of claim 12, wherein a paired group is defined based on the pairing information.

14. The apparatus of claim 12, wherein the at least one processor is further configured to detect a position of at which the touch input was initiated.

15. The apparatus of claim 12, wherein the at least one processor is further configured to detect a position of at which the touch input was completed.

16. The apparatus of claim 12, wherein the at least one processor is further configured to detect a time at which the touch input was initiated.

17. The apparatus of claim 12, wherein the at least one processor is further configured to detect a time at which the touch input was completed.

18. The apparatus of claim 12, wherein the at least one processor is further configured to operatively define the touch input that corresponds to the request to pair the apparatus with the at least one other mobile terminal.

19. The apparatus of claim 18, wherein the at least one processor defines the touch input based on user input.

20. The apparatus of claim 18, wherein the touch input corresponds to a defined swipe on a touchscreen of the apparatus.

21. An apparatus for pairing with at least one mobile terminal, the apparatus comprising:
   a transceiver configured to receive pairing information from at least one mobile terminal, the pairing information including a characteristic of the touch input; and
   at least one processor configured to operatively connect the apparatus with the at least one mobile terminal, based, at least in part, on the characteristic of the touch input broadcast by the at least one mobile terminal,
   wherein the characteristic of the touch input comprises at least two of:
      a location of the first mobile terminal,
      a position of at which the touch input was initiated,
      a position of at which the touch input was completed,
      a time at which the touch input was initiated,
      a time at which the touch input was completed, or
      a series of locations covered by the touch, and
   wherein the apparatus and the at least one mobile terminal are grouped within an application being executed on the apparatus.

22. The apparatus of claim 21, wherein the at least one processor is further configured to define the group comprising the apparatus and the at least one mobile terminal based on the received pairing information.

23. The apparatus of claim 22, wherein the at least one processor is further configured to determine a physical orientation of the apparatus and the at least one other terminal in the paired group relative to each other based on the pairing information.

24. The apparatus of claim 21, wherein the at least one processor is further configured to extract information regarding a touch input corresponding to a request to pair the at least one mobile terminal with the apparatus from the pairing information.

25. The apparatus of claim 21, wherein a touch input corresponding to a request to pair the at least one mobile terminal with the apparatus corresponds to a defined swipe on a touchscreen of the corresponding at least one mobile terminal.

26. A non-transitory computer readable storage medium storing instructions that when executed by at least one processor causes the at least one processor to perform a method of pairing mobile terminals, the method comprising:
   detecting a touch input corresponding to a request to pair a first mobile terminal with at least one other mobile terminal;
   broadcasting pairing information, the pairing information including a characteristic of the touch input; and
   connecting the first mobile terminal with the at least one other mobile terminal, based, at least in part, on the characteristic of the touch input broadcast by the first mobile terminal,
   wherein the characteristic of the touch input comprises at least two of:
      a location of the first mobile terminal,
      a position of at which the touch input was initiated,
      a position of at which the touch input was completed,
      a time at which the touch input was initiated,
      a time at which the touch input was completed, or
      a series of locations covered by the touch, and
   wherein the connecting of the first mobile terminal with the at least one other mobile terminal comprises grouping the first mobile terminal with the at least one other mobile terminal within an application being executed on the first mobile terminal.

* * * * *